United States Patent [19]

Bretzger et al.

[11] 4,262,405

[45] Apr. 21, 1981

[54] METHOD FOR INSTALLING A BEARING IN A UNIVERSAL COUPLING

[75] Inventors: Reinhard Bretzger, Gerstetten-Dettingen; Fritz Kienle, Königsbronn-Zang; Hans Lindenthal, Heidenheim-Mergelstetten, all of Fed. Rep. of Germany

[73] Assignee: Voith Transmit GmbH, Fed. Rep. of Germany

[21] Appl. No.: 52,815

[22] Filed: Jun. 27, 1979

Related U.S. Application Data

[62] Division of Ser. No. 903,053, May 5, 1978, Pat. No. 4,182,011.

[51] Int. Cl.$^3$ ............................................. B23P 19/04
[52] U.S. Cl. ........................................ 29/252; 29/280
[58] Field of Search ................ 29/434, 525, 148.4 A, 29/724, 252, 271, 280, 256, 258, 263; 64/17 R

[56] References Cited

U.S. PATENT DOCUMENTS

| | | | |
|---|---|---|---|
| 1,601,734 | 10/1926 | Goode | 29/263 |
| 1,972,455 | 9/1934 | Miller | 29/263 |
| 2,760,393 | 8/1956 | Stough | 81/57.38 |
| 2,866,370 | 12/1958 | Biach | 81/57.38 |
| 3,230,617 | 1/1966 | Spiess et al. | 29/148.4 A |
| 3,429,021 | 2/1969 | Spiess | 29/148.4 A |

*Primary Examiner*—James L. Jones, Jr.
*Attorney, Agent, or Firm*—Ostrolenk, Faber, Gerb & Soffen

[57] ABSTRACT

A universal coupling has two coupling forks; each fork is an integral unit with two fork eyes; an opening in each eye for receiving a bearing sleeve; a crosspiece with pins thereon, each pin to be received in a bearing sleeve; each bearing sleeve has a base; a bore through the crosspiece and extending along the axes of two aligned pins thereof; an aligned bore in the base of each bearing sleeve; a tie rod extends through the bores in the bearing sleeve bases and the crosspiece; a guide sleeve holds the tie rod at the other fork eye from the fork eye having a bearing sleeve installed; a pressure applying piston and cylinder connected between the tie rod and one of the bearing sleeves is operated for moving that bearing sleeve into the fork eye opening.

3 Claims, 1 Drawing Figure

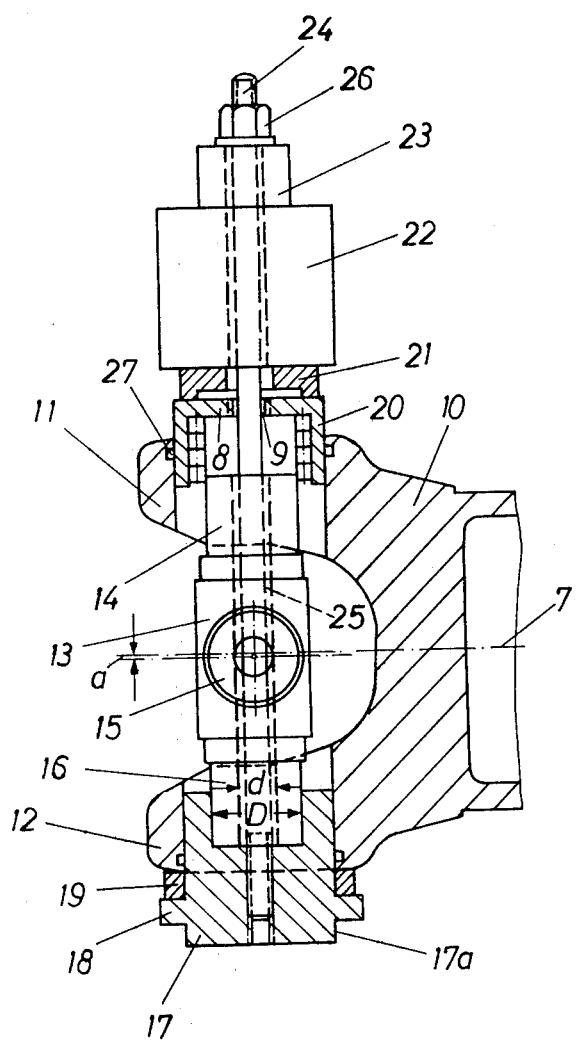

METHOD FOR INSTALLING A BEARING IN A UNIVERSAL COUPLING

This is a division of application Ser. No. 903,053, filed May 5, 1978, which is now U.S. Pat. No. 4,182,011.

BACKGROUND OF THE INVENTION

1. Field of the Invention

The invention relates to an apparatus for installing a bearing in a universal coupling of the so-called Hooke's Joint type. The invention also relates to couplings assembled by this method.

In particular, the Hooke's Joint couplings envisaged here are of the heaviest type of construction, such as those used to drive rolling mills, for example, and whose greatest external diameter, known as the diameter of rotation, can amount to more than one meter.

2. Description of the Prior Art

In known Hooke's Joint couplings of this kind (see, for example, Federal Republic of Germany Auslegeschrift No. 19 14 039), the coupling forks are made in more than one piece, i.e. each fork eye is divided across a diameter, so that one half of the fork eye can be removed from the coupling fork like a bearing cap. This means that the assembly of the Hooke's Joint coupling can be effected by first mounting the complete bearing assemblies (bearing sleeves with their rolling elements, generally rollers, located in them) on the pins of the crosspiece, and then inserting the crosspiece, together with the bearings, successively into the two couplings forks, after which each of the fork-eye halves are bolted to the coupling fork. The installation of the bearings and the assembly of the coupling is thus a relatively simple operation in this case. It is also possible to replace a bearing, for example at the site where the coupling is used, without the entire coupling shaft having to be removed from the drive line.

However, a particular disadvantage of the above described Hooke's Joint couplings lies in the fact that the coupling forks lose much of their rigidity because they are made in more than one piece. There is always a danger that where large torques are being transmitted, the coupling forks will be deformed, and with them the bearing housing as well, consequently reducing the working life of the bearings.

For this reason, attempts have been made to construct Hooke's Joint couplings, even of the largest size, with one-piece coupling forks. However, the installation of the bearings in the fork eyes of the coupling and the assembly of the one-piece coupling must be carried out by radically different means than is the case with Hooke's Joint couplings having split coupling forks. With a one-piece coupling, it is first necessary to insert the crosspiece into one of the coupling forks without the bearings. Then the bearings are pressed in and simultaneously pushed onto the crosspiece from the outside, along a direction parallel to the axis of the bearing. It is already known (from German Patent Specification No. 15 27 557) for a special pressing-in device to be used for inserting the bearings into the fork eyes. However, the known pressing-in device is unsuitable for use on couplings of the largest size, since the dimensions of the pressing-in device are considerably greater than those of the Hooke's Joint coupling. Naturally, it would also be possible to produce a pressing-in device of this kind for larger size Hooke's Joint couplings. However, such a large size device would have the disadvantages that it would be expensive to construct and it could only be used on the production site during the initial assembly of the Hooke's Joint couplings, while it could not, as a practical matter, be used to replace a bearing at the site where the Hooke's Joint coupling is in service. Since such a device would be extremely large and heavy, it would be impracticable to transport it to the site of the Hooke's Joint coupling installation.

SUMMARY OF THE INVENTION

Accordingly, it is the primary object of the invention to install a bearing in a Hooke's Joint coupling which has a one-piece coupling fork.

It is another object of the invention to be able to install the bearing using relatively lighter weight and smaller size installation equipment.

The invention therefore provides a method of installing a bearing in a larger size Hooke's Joint coupling, which has one-piece coupling forks, and wherein the installation uses easily transportable equipment.

According to one aspect of this invention, the method for assembling a universal coupling of the Hooke's Joint type serves to mount one of the four pins of a crosspiece into a one-piece coupling fork having two fork eyes, and to mount a bearing having a bearing sleeve and serving for pivotably supporting the crosspiece pin in the fork eye. The method comprises inserting a tie rod in a bore which is situated in the crosspiece and extends along the axes of the pins. The tie rod passes through a central bore in the bearing sleeve that appertains to one of the fork eyes and the rod is supported at the other fork eye. After this, the bearing sleeve is pressed into the fork eye appertaining to it with the aid of a pressing device that is attached to the tie rod.

Such a mehtod can be used both for replacing a single bearing and also for initially assembling the Hooke's Joint coupling from its separate component parts. A requirement for the application of the method according to the invention is that the crosspiece should have two bores extending along the mutually perpendicular axes of the pins of the crosspiece, and also that each bearing housing should have a central bore. A Hooke's Joint coupling with these features is already known from German Gebrauchsmuster Specification No. 69 08 115. However, in that instance, these bores are used only for holding or topping-up lubricant.

In the present invention, the known lubrication bores have the additional function described above, for receiving the tie rod and they are modified in such a way that they can be used for the introduction of a tie rod. For this purpose, the small diameter of the existing bores must be increased. Initially, there were doubts about enlarging the bores, since the pins in the crosspiece are subjected to a high level of bending stress. However, the cross-section of the pin is only weakened in the vicinity of the neutral axis when the bore diameter is increased, so that its bending strength is only slightly reduced. With the aid of the tie rod, the pressing-in of the bearing housing can be accomplished in a simple manner, for example, by using a conventional commercial hydraulic press or merely by using a nut screwed onto the tie rod.

A tie rod of this type must extend right through the entire Hooke's Joint coupling. However, since it is only subject to tension (not to bending load) during the pressing-in operation, its cross-section need not be very large. This means that the tie rod may be light in weight and thus easily transportable. By contrast, if an assembly tool having two or three gripping arms to grip the coupling forks around the outside were to be used, the above noted bores would not be required. But, such gripping arms would be located in the bending direction and thus would have to be of such heavy construction that the assembly tool could only be transported to the installation site with difficulty and could only be used there with the aid of a hoist.

According to another aspect of this invention, there is a universal coupling of the Hooke's Joint type having two one-piece coupling forks and a crosspiece with four pins. Each pin of the crosspiece is pivotably mounted, by means of a bearing with a bearing sleeve, in a respective fork eye of the coupling forks. The crosspiece has two bores extending along the axes of the pins. The base of each bearing sleeve has a central bore and the diameters of the bores in the crosspiece and of the bores in the base of the bearing sleeves are about 0.25 times to 0.4 times the external diameter of the crosspins.

BRIEF DESCRIPTION OF THE DRAWINGS

In order that the invention may be better understood, further objects and features of a Hooke's Joint coupling are now described, by way of example, with reference to the accompanying drawing which shows a longitudinal cross-section of the coupling, with one of the two coupling forks being omitted from the drawing for clarity.

DESCRIPTION OF THE PREFERRED EMBODIMENT

The coupling fork 10 has fork eyes 11 and 12. The crosspiece 13 is attached to the fork 10 and to the other fork (not shown). The crosspiece 13 has four cross pins, and three of the cross pins 14, 15 and 16 are shown. The crosspiece 13 was previously inserted in the coupling fork 10 prior to the state shown in the drawing. The cross-piece rests temporarily in a guide sleeve 17 that is inserted in the (lower) fork eye 12 for centering the crosspiece 13. For this, a two-part spacer ring 19 can be provided between a collar 18 on the guide sleeve 17 outside the fork eye 12 and the fork eye 12. The thickness of the ring 19 is chosen so that the crosspiece 13 is arranged initially a little offcenter (relative to the axis of rotation 7), being nearer to the lower fork eye 12 by an amount a.

For mounting the cross pin 14 in the (upper) fork eye 11, there is a multi-row roller bearing with a bearing sleeve 10. In the drawing the sleeve 20 is just being pressed into the fork eye 11. For this purpose, a pressure plate 21 is placed on the bearing sleeve 20. The cylinder 22 of a trunk piston press rests on the plate 21. The piston 23 is hollow, i.e. it has a central bore into which a tie rod 24 is inserted. In the condition shown in the drawing, the tie rod 24 has previously been passed through a threaded bore 9 in the bearing sleeve 20. (This bore is sealed off when assembly has been completed). The rod 24 has also been passed through a bore 25 in the crosspiece 13, and has been screwed into the guide sleeve 17. The guide sleeve 17 thus also serves to support the tie rod 24 against the lower fork eye 12 of the coupling fork 10. The piston 23 is supported on the tie rod 24 via a nut 26 tightened onto the rod 24. To enable the tie rod 24 to be inserted, the diameter d of the bore 25 and of the threaded bore 9 is greater than in previously known Hooke's Joint couplings. Preferably, the diameter d is around 0.25 times to 0.4 times the external diamter D of the cross pins 14, 15, 16.

When the cylinder 22 is supplied with pressure, the piston 23 attempts to move upward relative to the cylinder, which moves the cylinder down, pressing the bearing sleeve 20 down unitl it rests on the top of the cross pin 14. The positions of piston and cylinder could be reversed so that the piston rather than the cylinder presses on the bearing sleeve 20.

To secure the inserted bearing sleeve 20 in the fork eye 11, a circlip can be inserted in an annular groove 27 opening inside the opening in fork eye 11 that receives sleeve 20. In this case it is advisable, after the spacer ring 19 has been removed and with the cylinder supported directly on the fork eye 11, to press the bearing sleeve 20, together with the crosspiece 13, against the circlip by loading the piston 23 in the reverse direction. After this, the press 21 to 23, the tie rod 24 and the sleeve 17 are removed.

When the other journal bearing is installed in the fork eye 12, the crosspiece 13 has already been centered by the previously inserted bearing. For this reason, the guide sleeve 17 is now inserted in the coupling fork upside down, i.e. by its seat 17a, since it only serves now to support the rod 24 against the coupling fork.

After this, the crosspiece 13 and the other coupling fork (not shown in the drawing) are assembled together in the same way as described above.

Dismantling of a bearing can also be carried out with the aid of the trunk piston press 22, 23, and with a tie rod 24 screwed into the threaded bore 9 in the bearing sleeve 20. For this purpose, the base 8 of the bearing sleeve is made with considerably thicker walls than in previously known Hooke's Joint couplings so that as the bearing sleeve is drawn out, the base 8 is not permanently deformed by the tension exerted by the tie rod. Preferably, the wall thickness of the base 8 will amount to about 1/10 of the external diameter of the bearing sleeve 20.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Apparatus for emplacing a bearing sleeve in an opening in a fork eye of a coupling fork of a universal coupling which coupling is comprised of two coupling forks; said apparatus comprising:

a coupling fork of a single integral piece and having two spaced apart fork eyes;

a crosspiece, having two pins thereon; each said pin extending toward one of said fork eyes; said crosspiece having a bore therein extending along the axes of said two pins thereof;

an opening extending through one one said fork eye and being alignable with said bore in said crosspiece;

a bearing sleeve shaped to be fitted simultaneously in said fork eye opening and over the one of said pins which extends toward said one fork eye; said sleeve having a base; a bore through said base and said bore being alignable with said bore in said crosspiece; said bearing sleeve being placed at said opening of said one fork eye above said fork eye;

a tie rod extending through said crosspiece, through said one fork eye and through said base bore of said sleeve, and also being supported at the other said fork eye in such a manner that said sleeve is aligned both with said fork eye opening and with said one pin, whereby said sleeve can be simultaneously fitted into said fork eye opening and fitted over said one pin; and pressure applying means placed for applying pressure to said bearing sleeve for moving said bearing sleeve into said fork eye opening and for simultaneously fitting said sleeve over said one pin.

2. The apparatus for emplacing a bearing sleeve of claim 1, further comprising a guide sleeve at and outside of the other said fork eye and said tie rod passing through said other fork eye into said guide sleeve for being held there.

3. The apparatus for emplacing a bearing sleeve of either of claims 1 or 2, wherein said pressure applying means comprises a piston and cylinder combination, with one of said piston and said cylinder being attached to said tie rod and the other of said piston and said cylinder being placed to apply pressure to said bearing sleeve.

* * * * *